Patented Sept. 20, 1932

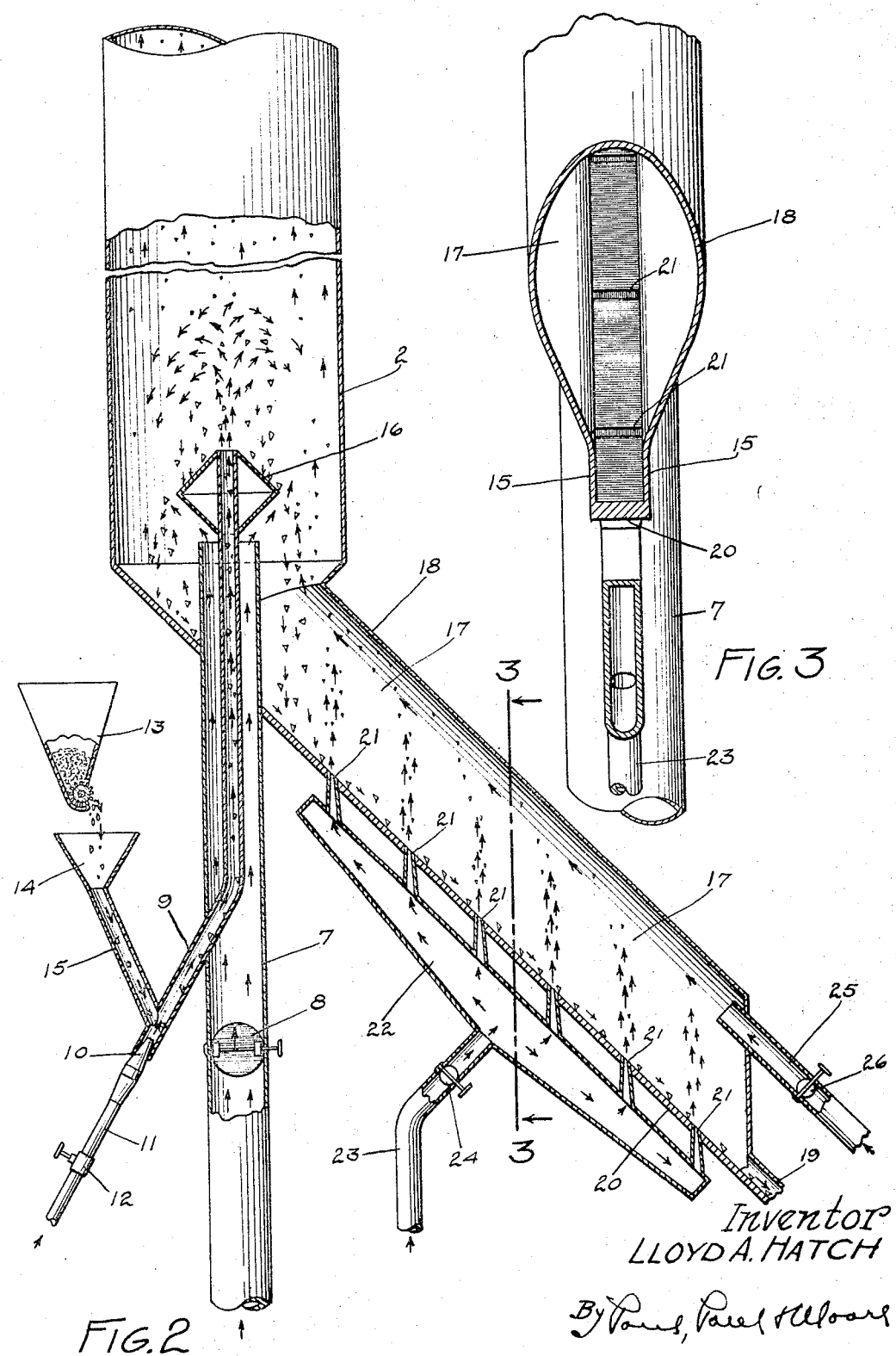

1,877,861

UNITED STATES PATENT OFFICE

LLOYD A. HATCH, OF ST. PAUL, MINNESOTA, ASSIGNOR TO MINNESOTA MINING & MANUFACTURING COMPANY, OF ST. PAUL, MINNESOTA, A CORPORATION OF MINNESOTA

PROCESS OF AND APPARATUS FOR SEPARATING MATERIALS

Application filed December 2, 1927. Serial No. 237,224.

This invention relates to an improved process of and apparatus for separating and grading or classifying fine materials such as abrasives, clays, pumice, rotten stone, etc., and which may also be used for separating or concentrating granular ore particles, according to their specific gravity.

An object of the invention is to provide an apparatus for separating fine material, comprising an upright stack of comparatively large diameter having a valve-controlled air supply pipe connected with the lower end thereof, and adapted to direct an air current upwardly therethrough, an air operated agitator throat or auxiliary refining chamber communicating with the lower end of the stack and having a series of ducts therein through which air is directed upwardly into the throat or chamber to agitate the material passing therethrough, and means being provided for delivering the material to be separated or classified into the lower portion of the stack, whereby it will be subjected to the upwardly flowing air current therein and the finer or lighter material removed from the coarser or heavier, after which the latter will drop by gravity into the inclined agitator throat or auxiliary refining chamber wherein it will be repeatedly subjected to the scrubbing action of the high velocity air jets therein to remove from the coarser or heavier particles, the finer or lighter particles adhering thereto, after which the fine-free heavier particles are discharged from the lower end of the throat preferably into a second separation or classification unit for further classification.

A further object is to provide an apparatus for separating and grading or classifying fine materials comprising one or more separating units, each comprising a stack provided at its top with a suitable separator adapted to remove the fine particles or abrasives from the air current discharging from the upper end of the stack, and each stack having means at its lower portion for effectively cleaning or removing from the coarser or heavier particles, the fine dust-like particles adhering thereto, and means for returning the finer dislodged particles to the stack where they may be carried upwardly and discharged into the separator provided at the upper end thereof.

A further object is to provide an apparatus of the class described comprising a material classifying stack or chamber, a pipe adapted to direct an air current upwardly through said chamber to sort out lighter from heavier particles, means for feeding the material to be classified to said chamber above the location of the entry of said air current therewith, whereby the air can separate lighter from heavier particles, an auxiliary refining chamber communicating with said sorting chamber below the location of the entry of the material therewith having an inclined bottom wall provided with means for projecting a plurality of spaced apart high velocity air jets thereinto, whereby the heavier particles traveling by gravity along the bottom of said auxiliary chamber will be subjected to the scrubbing action of said jets which will impinge directly upon the particles themselves whereby physical attraction will be overcome and the finer or lighter particles removed from the heavier, and means for returning the scrubbed off lighter particles to the sorting chamber, there to be classified with the lighter particles.

A further object is to provide an improved process for grading or classifying fine materials, which consists in subjecting the materials to an upwardly directed air current regulated to remove only the finer particles, allowing the coarser particles to descend by gravity against the action of said air current, repeatedly subjecting the coarser particles to the action of a series of upwardly directed air jets to remove therefrom the finer particles adhering thereto, and separately collecting the particles thus separated.

A further object is to provide a process for separating or classifying fine material composed of a mixture of fine particles, which consists in subjecting the material to be classified to the action of an upwardly directed substantially eddyless air current within a closed sorting chamber to sort or separate out the finer or lighter particles and carry them upwardly to a suitable collector, allowing the coarser or heavier particles to descend by gravity against the sorting current into an auxiliary refining chamber wherein the coarser particles are repeatedly subjected to the scrubbing action of upwardly directed high velocity air jets to dislodge therefrom the finer or lighter particles adhering thereto, returning the scrubbed off finer particles to the sorting chamber, and separately collecting the refined coarser particles.

The particular object of the invention, therefore, is to provide an improved air-operated apparatus for separating and grading or classifying fine materials such as abrasives, clays, pumice, rotten stone, etc., and which may also be successfully used in the separation of ore particles.

Other objects of the invention will appear from the following description and the accompanying drawings, and will be pointed out in the annexed claims.

In the accompanying drawings there has been disclosed a structure designed to carry out the various objects of the invention but it is to be understood that the invention is not confined to the exact features shown as various changes may be made within the scope of the claims which follow.

In the accompanying drawings forming part of this specification,

Figure 2 is an enlarged detailed sectional view showing the lower end of the stack, the means for delivering material thereto and the agitator throat or auxiliary refining chamber connected therewith;

Figure 3 is a vertical sectional view on the line 3—3 of Figure 2; and

Figure 1:
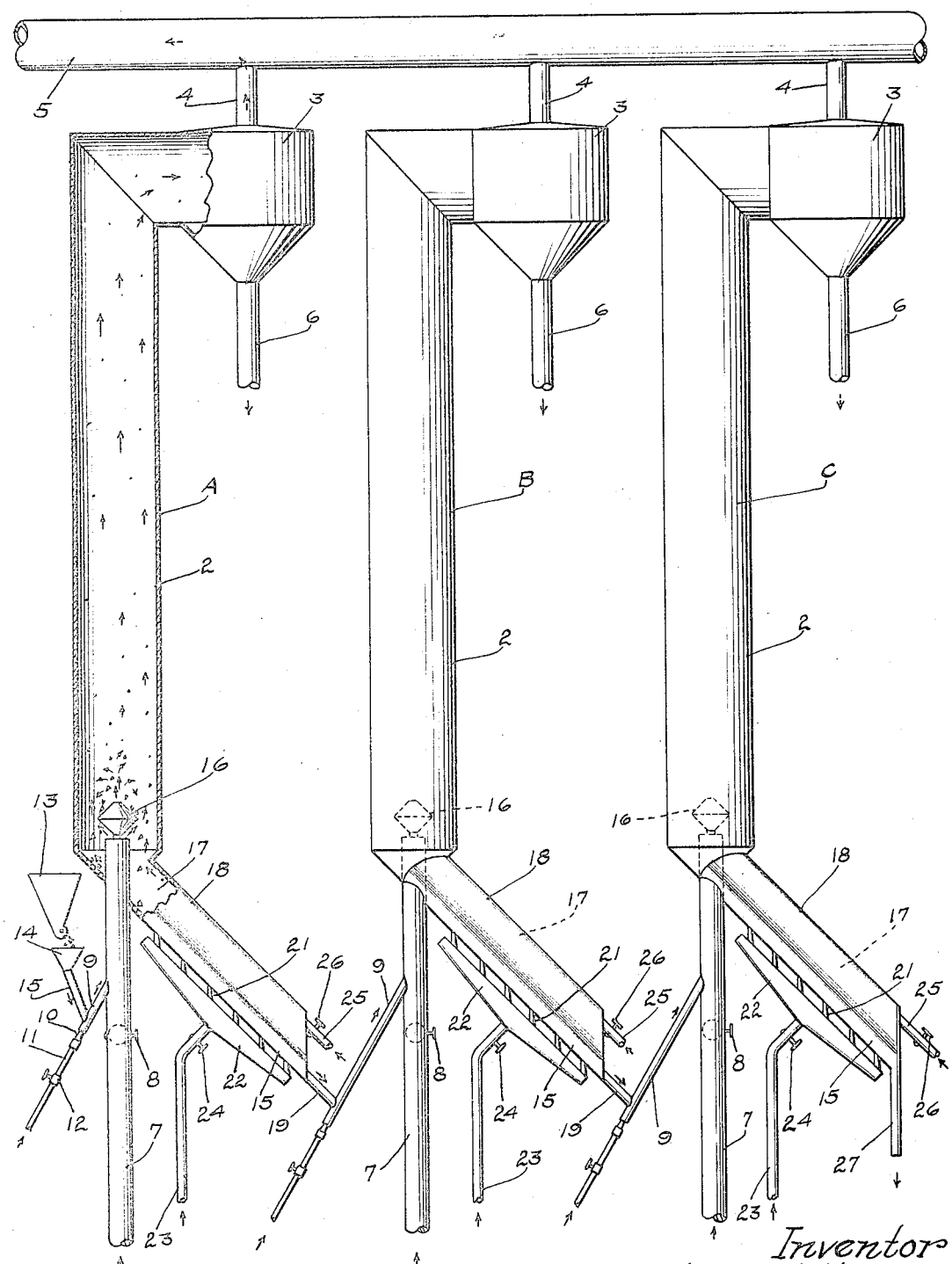
Figure 1 is a diagrammatic view illustrating the apparatus in its preferred form.

The novel separating apparatus featured in this invention preferably comprises a plurality of separating or classification units as shown in Figure 1. These units are similar in construction and therefore but one need be described in detail.

Each unit comprises an upright stack 2, of comparatively large diameter, having a suitable separator 3, preferably of the cyclone type, connected with the upper end thereof as shown. This separator is connected by a pipe 4 to a suction trunk 5, having a connection with a suitable suction means, not shown. The separator 3 is provided at its lower end with the usual discharge spout 6. An air supply pipe 7 is connected with the lower portion of the stack 2 and has a valve 8 therein, preferably of the diaphragm type, whereby the supply of air to the stack may be regulated to the desired degree.

The material to be separated is delivered into the lower portion of the stack 2 by means of a feed pipe 9, here shown operated by an injector 10, provided at the lower end thereof as shown in Figure 2. The injector nozzle is connected by a pipe 11 to a suitable air supply, not shown. A valve 12 provides means for regulating the flow of air through the pipe 11. The unseparated material may be discharged from a main hopper 13 into a smaller hopper 14, having a pipe connection 15 with the feed pipe 9 at a point above the injector nozzle 10. The other end of the feed pipe 9 terminates at a point within the lower end of the stack 2 and slightly above the upper end of the air pipe 7, which, it will be noted by reference to Figure 2, extends upwardly into the bottom of the stack. A cone-shaped member 16 is secured to the upper end of the feed pipe 9 and the lower surface thereof functions to outwardly direct the upwardly flowing air current discharging from the pipe 7, as indicated by the arrows. The upper conical surface member 16 functions to direct the larger particles outwardly away from the discharge end of the pipe 7 so that they will be discharged into the lower portion of the stack.

An important feature of this invention resides in the provision of an air-operated agitator throat or auxiliary refining chamber 17, having a connection with the lower end of the stack and downwardly extending at an angle therefrom. This agitator throat or auxiliary chamber 17 comprises a casing 18 suitably secured to the lower end of the stack 2, and having its lower end terminating in a discharge spout 19, as shown in Figure 2. The upper portion of the casing 18 is preferably oval in cross-section, as shown in Figure 3, and the lower portion thereof is provided with substantially parallel wall portions 15, secured to the bottom wall 20, as clearly shown in Figure 3. A plurality of elongated air ducts 21 are provided in the bottom wall 20 of the casing 18. Each such air duct is connected with a manifold 22, having a pipe 23 connecting it with a suitable source of air pressure, not shown. A valve 24 is provided in the pipe 23 to control the air flow therethrough.

A conduit 25 is connected with the lower end of the casing 18 adjacent to the upper portion thereof. This conduit is connected with a source of low pressure air, and functions to direct a low pressure air current upwardly through the upper portion of the auxiliary chamber 17, as indicated by the arrows in Figure 2. A valve 26 provides means for regulating the air flow through the conduit 25.

Operation

The operation of this novel separating and grading or classifying apparatus may be explained with reference to Figures 1 and 2. The material to be classified is introduced into the lower portion of the stack 2 by means of the injector-operated feed pipe 9, and is projected upwardly into the stack above the cone shaped member 16 in the form of a fountain, as indicated by the arrows in Figure 2. The material thus delivered into the lower portion of stack 2 is then subjected to the action of the upwardly rising air current delivered to the stack from the pipe 7. When a plurality of units A, B and C are employed, as shown in Figure 1, the velocity of the air flowing upwardly in the stack 2 of unit A, is preferably regulated so that it will sort out or remove only the finer from the coarser material. The finer material is discharged from the upper end of the stack into the cyclone separator 3 where the foreign material such as dust, is drawn into the suction trunk 5 and the fine material discharged from the spout 6 into a suitable receiving means, not shown. The upwardly sorting current in the stack 2 is substantially eddyless, and can be accurately controlled by means of the valve 8 provided in the supply trunk 7, and the valves 24 and 26.

As the material to be classified is delivered into the bottom of the stack, the larger particles which are too heavy to be lifted by the air current in the stacks of unit A, will descend by gravity into the agitator throat or auxiliary chamber 17, and thence slide downwardly upon the inclined bottom wall 20 thereof as shown in Figure 2. As the larger particles slide down the bottom wall 20, they will be subjected to the scrubbing action of the upwardly directed high velocity air jets projected from the ducts 21, which impinge directly upon the particles themselves and thereby dislodge the finer from the coarser particles. If the larger particles are too heavy to be carried upwardly by the low pressure air current discharging from the conduit 25, they will descend by gravity to the bottom of the throat 17 and will thus be successively subjected to the action of the high velocity air jets issuing from the ducts 21, until they reach the lower end of the throat and are discharged through the pipe 19 into a suitable bin, or, as shown in Figure 1, into the feed pipe 9 of the next operating unit B. As the heavier particles are thus thoroughly agitated in their passage through the throat 17 of unit A, all of the finer dust-like particles adhering thereto by physical attraction, will be scrubbed off or removed therefrom and returned to the stack 2 by the low pressure air current flowing from the conduit 25.

When a plurality of units are employed as shown in Figure 1, the velocity of the upwardly flowing air current in the stack 2 of the second unit will be increased sufficiently to remove the medium fine material, which will be discharged from the pipe 6 of the cyclone separator 3 of unit B, into a suitable bin, not shown. The remaining heavier particles will be subjected to a second agitating or refining operation in the agitator throat or auxiliary chamber 17 of unit B, employing higher velocity air jets after which they will be delivered to the feed pipe 9 of unit C. The velocity of the upwardly flowing sorting current in unit C will likewise be regulated to be higher than that of units A and B so that the next finest or medium sized material will be removed from the remaining coarser material in stack 2 of unit C. The medium fine material will similarly be discharged from the pipe 6 of unit C into a suitable bin, not shown. As the material has thus been subjected to the rising air currents in the stacks 2 of each unit, the material discharged from the pipe 27 of the agitator throat 17 of unit C, will consist of the coarsest or heaviest particles, all of the finer and medium sized particles having been removed therefrom and delivered into their respective bins by the action of the sorting currents flowing upwardly through the stacks 2 of the three units. Thus it will be seen that when using three units as above described, four distinct separations are obtained, such for instance as fine, medium fine, medium and coarse.

From the foregoing, therefore, it will be seen that the separation or classification of the different particles constituting the mass of material to be classified, is obtained by the actions of the sorting currents in the stacks 2, and the high velocity jets in the auxiliary chamber 17. The fine particles rising with the air current in each stack becomes more and more uniform as they proceed upwardly therein, and the medium sized particles drop behind. When the fine particles reach the top of the stack, they are discharged therefrom into the cyclone separator 3 where they are separated from the dust by centrifugal action, the dust being carried away by the suction pipe 5. A definite velocity of the air in any given stack will lift over a definite sized particle and no more. The uniformity of the grade discharge from the bottom of each throat depends upon the efficiency of the scrubbing and refining action or aeration taking place in the throat, which can readily be controlled to the desired degree by means of the control valve 24, provided in the air supply pipe 23.

In operation, the stack of unit A is preferably operated with a slow velocity sorting current, thereby taking out only the finest of the particles, and the throat product of unit A becomes the feed of unit B as shown. Unit B is operated with a slightly higher velocity sorting current so as to carry over only the medium sized particles, and the throat product of this unit becomes the feed of unit C. This latter unit operates at a still higher velocity, whereby the lighter or medium sized particles are removed from the heavier or larger ones, and are carried upwardly to the top of the stack in a manner similar to the action of the material in units A and B. The throat discharge of unit C consists of the largest and heaviest particles, thoroughly cleaned, and these are discharged through the spout 27 into a suitable receiving means, not shown.

The side walls of the casing 18 of the agitator throat 17 of each unit are constructed as shown in Figure 3, that is, the lower wall portions 15 are substantially parallel for a short distance upwardly from the bottom wall 20 of the throat. It will also be noted by reference to this figure that the air ducts 21 extend the full width of the lower portion of the throat, or, from wall 15 to wall 15, so that no material can pass through the throat without being subjected to the upwardly directed high velocity air jets projected from the ducts 21. Thus all of the material passing through the throat will be successively subjected to the action of each air duct 21, thereby scrubbing off or removing from the heavier all of the finer particles which may adhere thereto by physical attraction. These lighter particles which are thus removed from the heavier particles, as they pass downwardly through the throat, will be returned to the stack by the flow of air through the upper portion of the throat, whereby all of the finest particles which can be lifted by the velocity of the air in the stack, will be carried upwardly and discharged into the separator 3 at the upper end of the stack. The coarser particles discharged from the spout 19 will thus be thoroughly cleaned and separated from the lighter particles, and the lighter particles, as hereinbefore stated, will be carried upwardly through the stack by the velocity of the sorting current therein and discharged into the separator at the upper end of the stack, from which they will be discharged through the pipe 6 into a suitable receiving means. Separation of the different sized particles, therefore, is accomplished entirely by the action of air currents.

By the employment of a sufficient number of units suitably connected together an apparatus may be provided which will lend itself admirably to the continuous and simultaneous classification of several grades or classes of fine particles which may be contained in a given mixture. Each unit consists essentially of a classification or sorting chamber and an agitator throat or auxiliary refining chamber, as shown in Figure 2.

In mixtures of finely ground material, it is the nature of the finer or lighter particles to adhere to the coarses or heavier particles, due to physical attraction; and the physical force by which they adhere defies all ordinary means to separate them, and requires that sufficient work be done directly upon the adhering particles to cause their physical separation. The fact that this phenomena has been overlooked is responsible for the ineffectiveness of both hydraulic and pneumatic classification systems now commonly employed. No ordinary means will suffice. Work must be done directly upon the particles themselves to overcome the physical force by which the finer particles adhere to the coarser. I have found that the most effective means for overcoming this physical force or attraction between particles, resides in subjecting the particles to be refined to the action of high velocity air jets arranged to impinge directly upon the particles and thereby forcibly dislodge or scrub off the finer or lighter particles from the heavier, resulting in the heavier particles being rendered fine-free and thus thoroughly cleaned or refined.

Figure 4:
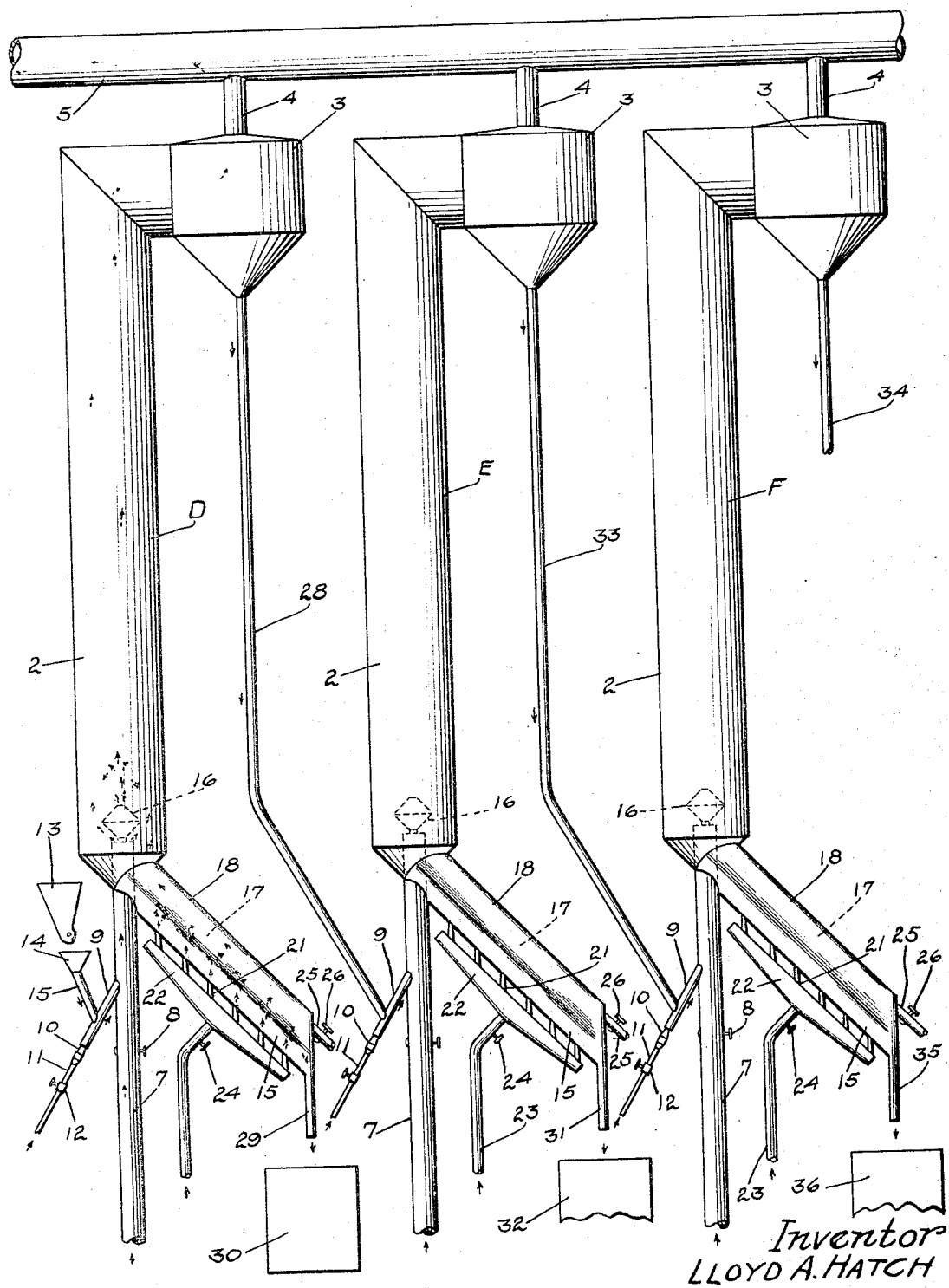
Figure 4 is a view similar to Figure 1, illustrating a modified arrangement of the apparatus.

Figure 4 shows a modified installation wherein stack 2 of unit D operates with a very high air velocity which is regulated so as to lift over all but the very largest particles, that is, the fine, medium fine and medium sized particles will be carried upwardly through the stack of unit D and discharged into the separator 3, from which they will be delivered to the feed pipe 9 of unit E by means of a down spout 28. The coarser particles will be discharged from the spout 29 into a suitable bin 30, as shown. Stack 2 of unit E is operated at a slightly lower air velocity than unit D, or, at a velocity which is regulated so as to lift over only the fine and medium fine particles, the medium sized particles being discharged from the spout 31 of unit E into a bin 32. From the separator 3 of unit E, the fine and medium fine particles will be delivered, by means of a pipe 33, to the feed pipe 9 of unit F. Stack 2 of unit F is operated with an air velocity still lower than the velocity of the air in the stack of unit E, and is regulated so as to carry over only the fine sized particles, which will be discharged through pipe 34 into a suitable receiving means, not shown. The medium fine particles will be discharged from a pipe 35, provided at the lower end of the throat of unit F, into a suitable receiving bin 36. The operation of the installation shown in Figure 4, therefore, is similar to the operation of the installation shown in Figure 1, that is separation or classification of the particles is obtained by controlled air curents.

In actual operation of an installation such as that shown in Figure 1, it has been found that the grading of fine materials such as abrasives, pumice, clays, rotten stone, etc., may be readily accomplished in a comparatively short time. An important feature of the apparatus is that the feeding of the material to be classified into the apparatus may be continuous, thereby greatly increasing the capacity of the apparatus as compared with structures now used for separating such maaterials. In the drawings I have shown the separators 3 as being of the usual cyclone type, but it is to be understood that any suitable type of separator may be used in place of those shown, without departing from the scope of the invention. All of the air supply pipes connected with the apparatus are provided with suitable valves for controlling and regulating the flow of air through the apparatus so that any desired degree of separation may be obtained, it being understood that the separation of the different sized materials is brought about by the velocity of the upwardly flowing sorting current in the stack of each unit. In the drawings, I have also shown three units operating in series. The number of units employed may be varied from one to any desired number and is usually determined by the number of grades into which the material is to be classified. When three units are used as shown in Figure 1, four distinct grades are obtained, while, when a single unit is used, only two grades are obtained. The number of units employed, therefore, is dependent upon the material and the number of grades into which it is to be classified.

This apparatus may also be used for the separation of mixtures of ores having different specific gravities. In subjecting such a material to the action of this classifier, the lighter particles are carried upwardly and the heavier particles settle downwardly against the sorting current, into the agitator throat or auxiliary refining chamber 17 where they are further refined by the scrubbing action of the air jets projected from the ducts 21 and which impinge directly upon the particles themselves, resulting in the heavier particles being discharged substantially free from particles of lesser specific gravity. The operation of the apparatus, when used for separating fine particles according to their specific gravity, is identical to the operation employed when separating particles of different sizes from a mixture of homogeneous specific gravity. The action of classifying and refining is based solely upon the mass of the particles.

I claim as my invention:

1. A process of separating coarser from finer material, which consists in subjecting the material to an upwardly directed substantially eddyless air current within a closed sorting chamber, regulating said air current so as to cause it to sort and separate out the finer particles and carry them upwardly to a suitable collector, allowing the coarser particles to descend by gravity against such air current into an auxiliary refining chamber wherein said coarser particles are subjected to the scrubbing action of upwardly directed high velocity air jets to remove therefrom the finer particles adhering thereto, returning said scrubbed off finer particles to the sorting chamber, and separately collecting the refined coarser particles.

2. A process of separating coarser from finer material, which consists in subjecting the material to an upwardly directed substantially eddyless air current within a closed sorting chamber, regulating said air current so as to cause it to sort and separate out the finer paricles and carry them upwardly to a suitable collector, allowing the coarser particles to descend by gravity against such air current into an auxiliary refining chamber wherein said coarser particles are successively subjected to the scrubbing action of a series of upwardly directed high velocity air jets to remove therefrom the finer particles adhering thereto, returning said scrubbed off finer particles to the sorting chamber, and separately collecting the refined coarser particles.

3. A substantially vertical material classifying stack of comparatively large diameter having a valve-controlled air supply pipe connected with the lower portion thereof adapted to direct a current of air upwardly therethrough, an injector-operated feed pipe for delivering the material to be classified into the lower portion of said stack, an inclined agitator throat connected with the lower end of said stack and adapted to receive the coarser material therefrom, a discharge at the lower end of said agitator throat, a series of transverse air ducts in the inclined bottom wall of said throat, means for delivering air under pressure thereto whereby a plurality of upwardly directed air jets of high velocity will be provided in said throat adapted to thoroughly agitate the coarser material as it travels downwardly therethrough and dislodge therefrom the finer particles adhering thereto, and a valve-controlled low pressure conduit connected with the lower end of said throat for directing an air current lengthwise of the throat to return the finer dislodged particles to said stack.

4. An apparatus for classifying finely ground abrasives, including a separation stack of large diameter and comparatively high, a pipe adapted to direct a current of air upwardly through the stack, an inclined agitator throat communicating with the lower portion of the stack and adapted to receive the coarser and heavier particles, means for delivering the material to be classified into the lower portion of the stack, the ascending column of air in said stack sorting out the finer and lighter particles and carrying them upwardly through the stack, a plurality of air ducts in the bottom wall of the agitator throat, means for delivering air under pressure to said ducts whereby high velocity air jets will be projected into the throat and impinge directly upon the particles passing therethrough whereby the finer and lighter particles adhering to the coarser and heavier particles by physical attraction are dislodged therefrom, and means for returning the finer dislodged particles to the stack, there to be classified with the lighter particles.

5. A substantially vertical material classifying stack of comparatively large diameter having an air supply pipe connected with the lower portion thereof adapted to direct a current of air upwardly through the stack, means for delivering the material to be classified into the lower portion of said stack, an inclined agitator throat communicating with the lower end of the stack and adapted to receive the coarser material therefrom, a discharge at the lower end of said agitator throat, a series of air ducts in the bottom wall of said throat, means for delivering air under pressure to said ducts whereby a plurality of upwardly directed air ducts of high velocity will be provided in said throat adapted to thoroughly agitate the coarser material as it travels downwardly therethrough, and a low pressure conduit connected with the lower end of said throat adapted to direct an air current lengthwise of the throat to return the finer dislodged particles to the stack, thereto be classified with the lighter particles.

6. An apparatus of the class described, including an upright material classifying chamber, means adapted to direct a current of air upwardly through said chamber, means for feeding the material to be classified to said chamber above the location of the entry of said air current whereby the air can separate lighter from heavier particles, an auxiliary chamber communicating with said classifying chamber below the location of the entry of the material therewith, a portion of the heavier particles being permitted to travel by gravity along a wall of said auxiliary chamber, means for forcing spaced-apart jets of air into said auxiliary chamber and directly into the material whereby air may impinge directly upon the particles to scrub off finer from heavier particles, and means for causing the scrubbed off particles to return to the stack to there be classified with the lighter particles.

7. An apparatus of the class described, including a material classifying chamber, means adapted to direct a current of air upwardly through the stack, means for feeding the material to be classified to said chamber above the location of the entry of said air current whereby the air can separate lighter from heavier particles, said classifying chamber having an auxiliary chamber communicating therewith below the location of the entry of the material therewith, said auxiliary chamber having an inclined bottom wall provided with a plurality of spaced-apart transversely disposed air ducts, a portion of the heavier particles being permitted to travel by gravity along said bottom and over said ducts, means for forcing air through said air ducts and directly into the material whereby air may impinge directly upon the particles and scrub off finer from heavier particles, and means for causing the scrubbed off particles to return to the classifying chamber to there be classified with the lighter particles.

8. An apparatus of the class described, including a material classifying stack, a pipe adapted to direct a current of air upwardly through the stack, means for feeding the material to be classified to said stack above the location of the entry of said air current whereby the air can separate lighter from heavier particles, an inclined agitator throat connected with the stack below the location of the entry of the material and having a trough-like bottom wall along which a portion of the heavier particles are caused to travel by gravity, said bottom wall having a plurality of spaced-apart transversely disposed air ducts therein extending substantially the full width of said bottom wall, means for forcing air through said ducts and directly into the material to cause air to impinge directly upon the particles to scrub off finer from heavier particles, the scrubbing action resulting from the air thus impinging directly against the particles, causing the work to be done directly upon the particles themselves to overcome the physical attraction between particles, and means for returning the scrubbed off finer particles to the stack to there be classified with the lighter particles.

9. An apparatus of the class described, including a material classifying stack, a pipe adapted to direct a current of air upwardly through the stack, means for feeding the material to be classified to said stack above the location of the entry of said air current whereby the air can separate lighter from heavier particles, an inclined agitator throat connected with the stack below the location of the entry of the material, a portion of the heavier particles being adapted to travel by gravity along a wall of said agitator, means for forcing spaced-apart jets of air through said wall and directly into the material whereby air may impinge directly upon the particles to scrub off finer from heavier particles, and means for directing a low pressure air current through the upper portion of said throat to return the scrubbed off finer particles to the stack to there be classified with the lighter particles.

10. An apparatus of the class described, including a material classifying stack, a pipe adapted to direct a current of air upwardly through the stack, means for feeding the material to be classified to said stack above the location of the entry of said air current whereby the air can separate lighter from heavier particles, an agitator throat connected with the stack below the location of the entry of the material and having an inclined bottom wall provided with a plurality of transversely disposed air ducts, spaced apart lengthwise of the throat, a portion of the heavier particles being adapted to travel by gravity along said bottom, means for forcing air through said air ducts and directly into the material whereby air may impinge directly upon the particles and scrub off finer from heavier particles, and means for directing a low pressure air current through said agitator throat to return the scrubbed off lighter particles to the stack to there be classified with the lighter materials.

11. An apparatus of the class described, including a material classifying stack, a pipe adapted to direct a current of air upwardly through the stack, means for feeding the material to be classified to said stack above the location of the entry of said air current whereby the air can separate lighter from heavier particles, an inclined agitator throat connected with the stack below the location of the entry of the material, said throat having a trough-like bottom wall along which a portion of the heavier particles are adapted to travel, said bottom wall having a plurality of spaced-apart air ducts therein extending substantially the full width thereof, means for forcing air through said ducts and directly into the material to cause air to impinge directly upon the particles to scrub off finer from heavier particles, the scrubbing action resulting from the air impinging directly against the particles causing the work to be done directly upon the particles themselves to overcome physical attraction between particles, and means for directing a low pressure air current through said throat to return the scrubbed off finer particles to the stack to there be classified with the lighter particles.

12. An apparatus of the class described, including a classification chamber having means for delivering the material to be classified thereto, means for directing a low velocity air current upwardly through said chamber to sort out the finer and lighter particles from the coarser and heavier, said classification chamber having an auxiliary refining chamber communicating with said stack and adapted to receive the coarser particles, means for projecting a series of spaced-apart high velocity air jets through the bottom wall of said auxiliary chamber whereby particles traveling therethrough will be repeatedly acted upon by said air jets to cause the finer lighter particles to be removed from the coarser particles, and means for returning the removed lighter particles to said classifying chamber.

In witness whereof, I have hereunto set my hand this 28th day of November, 1927.

LLOYD A. HATCH.